US006672787B2

(12) United States Patent
Tucker

(10) Patent No.: US 6,672,787 B2
(45) Date of Patent: Jan. 6, 2004

(54) SYSTEM AND METHOD FOR BI-DIRECTIONAL ACCESS TO A FASTENING DEVICE

(75) Inventor: Sean William Tucker, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/080,168

(22) Filed: Feb. 21, 2002

(65) Prior Publication Data

US 2003/0156890 A1 Aug. 21, 2003

(51) Int. Cl.[7] .............................................. H05K 07/16
(52) U.S. Cl. .............................. 403/53; 403/57; 16/261; 16/264; 361/683
(58) Field of Search ............................... 403/53, 57, 59, 403/60; 248/291.1; 16/260, 261, 262, 263, 264; 312/223.2; 361/683, 724

(56) References Cited

U.S. PATENT DOCUMENTS

| | | | | | |
|---|---|---|---|---|---|
| 1,502,431 | A | * | 7/1924 | Hubbard | 16/262 |
| 4,765,025 | A | * | 8/1988 | Salazar | 16/261 |
| 4,821,025 | A | * | 4/1989 | Ross, Sr. | 248/291.1 X |
| 5,359,587 | A | * | 10/1994 | Uehara | 16/260 X |
| 5,593,046 | A | * | 1/1997 | Katsuura et al. | 312/223.2 X |
| 5,937,480 | A | * | 8/1999 | Kiefer | 16/260 |
| 6,386,656 | B1 | * | 5/2002 | Chen | 312/223.2 |
| 6,388,876 | B1 | * | 5/2002 | Chen | 312/223.2 X |
| 6,471,310 | B2 | * | 10/2002 | Montagna | 312/223.2 |
| 6,491,360 | B2 | * | 12/2002 | Qiu | 312/223.2 X |
| 6,529,373 | B1 | * | 3/2003 | Liao et al. | 312/223.2 X |

* cited by examiner

Primary Examiner—Lynne H. Browne
Assistant Examiner—Ryan M. Flandro

(57) ABSTRACT

The present invention is directed to a fastening system comprising a first mounting bracket rotatably attached to a first assembly, a second mount bracket rotatably attached to a second assembly and a rigid attachment between the first mount bracket and the second mount bracket wherein the attachment enables the first mount bracket and the second mount bracket to rotate together about a common axis and wherein the attachment enables a portion of the first mount bracket and a portion of the second mount bracket to be separated by space.

5 Claims, 3 Drawing Sheets

SYSTEM AND METHOD FOR BI-DIRECTIONAL ACCESS TO A FASTENING DEVICE

TECHNICAL FIELD

The present invention generally relates to accessing fastening devices and more specifically to a method and apparatus that enables bi-directional access to a fastening device.

BACKGROUND

In many mechanical connections, direct access to a connecting structure such as a screw, bolt, or other fastener, is limited. One area where limited access to a fastener is commonplace is in automotive mechanics. Access to bolts that connect engine components, such as water pumps, pulleys or similar components, to the engine block or to each other is typically limited so that mechanics have to work on the bolts from a specific direction. Moreover, in automotive mechanics, additional engine components may have to be removed or repositioned to access fasteners that are otherwise inaccessible.

Similarly, within mainframe computers and personal computers, connecting structures, such as bolts screws and other fasteners, are used to attach computer components to the computer chassis. For example, a computer hard drive is typically mounted in the computer chassis. The mounting preferably enables removal and installation of a hard drive, for example, during repairs or upgrades of a hard drive, or replacements of one type of hard drive with another.

There are a number of ways that a computer hard drive may be mounted in a computer. A hard drive may be directly mounted to a chassis with screws or other fasteners. Alternatively, a carrier, such as a shelf or tray, may be attached to the chassis and the hard drive may be connected to the carrier. Other approaches include mounting slides, sleds, skis or rails to the sides of the hard drive, wherein the slides, rails, etc. couple to corresponding grooves or guides that are attached to the chassis and that hold the hard drive in place. These attachments include tabs or similar features that prevent the hard drive from moving. Attachment may also be achieved between the hard drive and the chassis by a snapping mechanism.

A major limitation to attaching a hard drive or other component to a chassis with screws is the limited access to the screw from directly in front of the screw. In order to remove or insert the screw, access to the head of the screw and room to rotate the handle of the screw driver are both required. Typically, due to the densely-populated computer chassis, the hard drive is removed in the same direction as the screw. Similarly, when a slide arrangement is used (skis or sleds), the hard drive must slide into and out of the chassis along the slide (skis or sleds). The problem of fastener access is aggravated when the fastener is in a very tight space in the chassis. For example, when the hard drive is mounted right up against the chassis wall it is difficult to gain access to the fasteners that are used to hold the hard drive in place. Similarly, access to bolts and other fastening devices may be limited.

Similar considerations are involved in other mechanical devices such as airplanes, cars, snow mobiles, office equipment, engines, generators, and other mechanical devices in that fastening devices that fasten components within the system must be approached from a single direction.

SUMMARY OF THE INVENTION

The present invention is directed to a fastening system comprising a first mounting bracket rotatably attached to a first assembly, a second mount bracket rotatably attached to a second assembly and a rigid attachment between the first mount bracket and the second mount bracket wherein the attachment enables the first mount bracket and the second mount bracket to rotate together about a common axis and wherein the attachment enables a portion of the first mount bracket and a portion of the second mount bracket to be separated by space.

DETAILED DESCRIPTION

The present invention enables access to a fastener, such as a mounting screw, from multiple directions by allowing the fastener to pivot to provide easy access. The present invention is broadly applicable to numerous mechanical connections, but the invention will be described in terms of mounting a hard disk within a computer system. The figures show an exemplary embodiment related to accessing a hard drive from two directions, e.g., accessing the mounting screw from either the top or front of the cabinet.

This invention arose from the need to be able to remove a device (such as a hard drive) from more than one direction, such as from either the top of the chassis or from the front or side of the chassis. Each previous method for mounting hard drives precludes removal from more than one direction because the mounting screws may be removed only in a single direction. In contrast, the present invention enables, for example, a hard drive to be ejected and removed from the chassis in at least two directions while still maintaining a solid, rigid, mechanical mounting to secure the device in the chassis. One embodiment of the present invention comprises two brackets that are attached together and enables simultaneous rotation of the brackets around a central rotation axis. The present invention further enables a screw to be screwed through one bracket and into another bracket to form a tight, rigid mount that still enables rotation of the connections between the brackets and the corresponding assembly about a central pivot point. This enables the user to access the head of the screw or other fastener with a screwdriver either, for example, from the top or from the side just by rotating the appropriate joint.

In a computer environment a hard drive may be mounted to a device bracket that is made out of, for instance, sheet metal. The device bracket may also be mounted to a floor piece that is also sheet metal.

Figure 1:
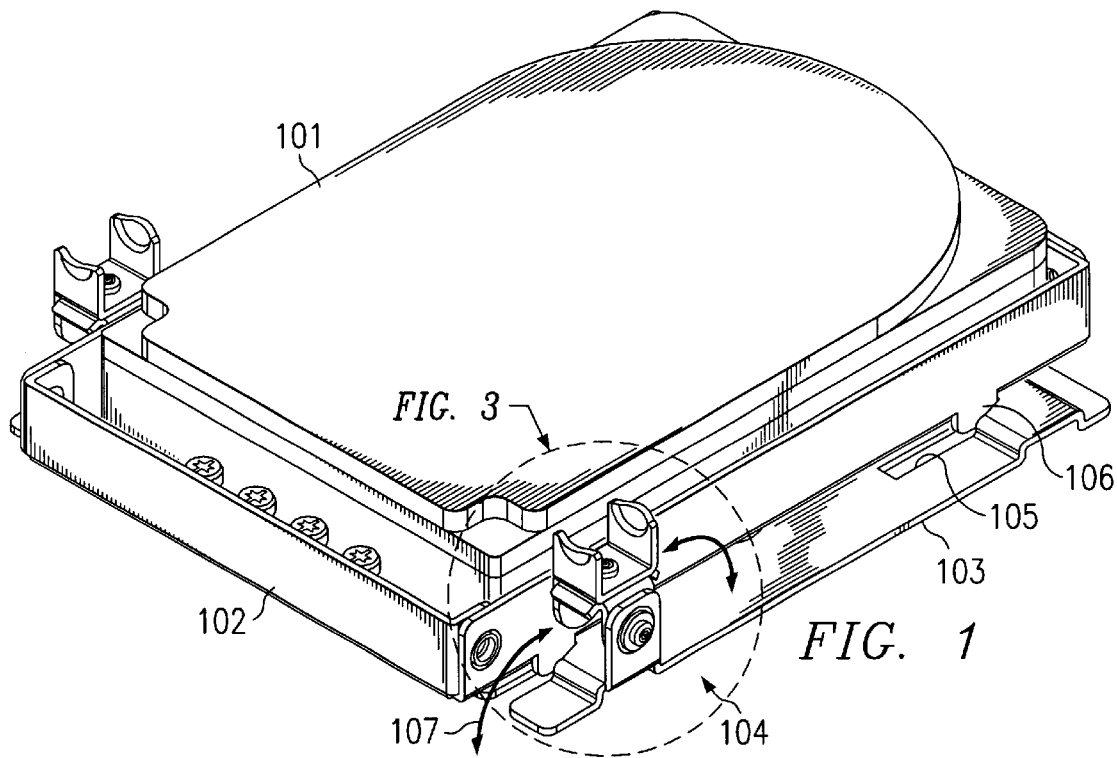
FIG. 1 is a perspective view illustrating an exemplary embodiment of the present invention as used on a computer hard disk.
Figure 2:
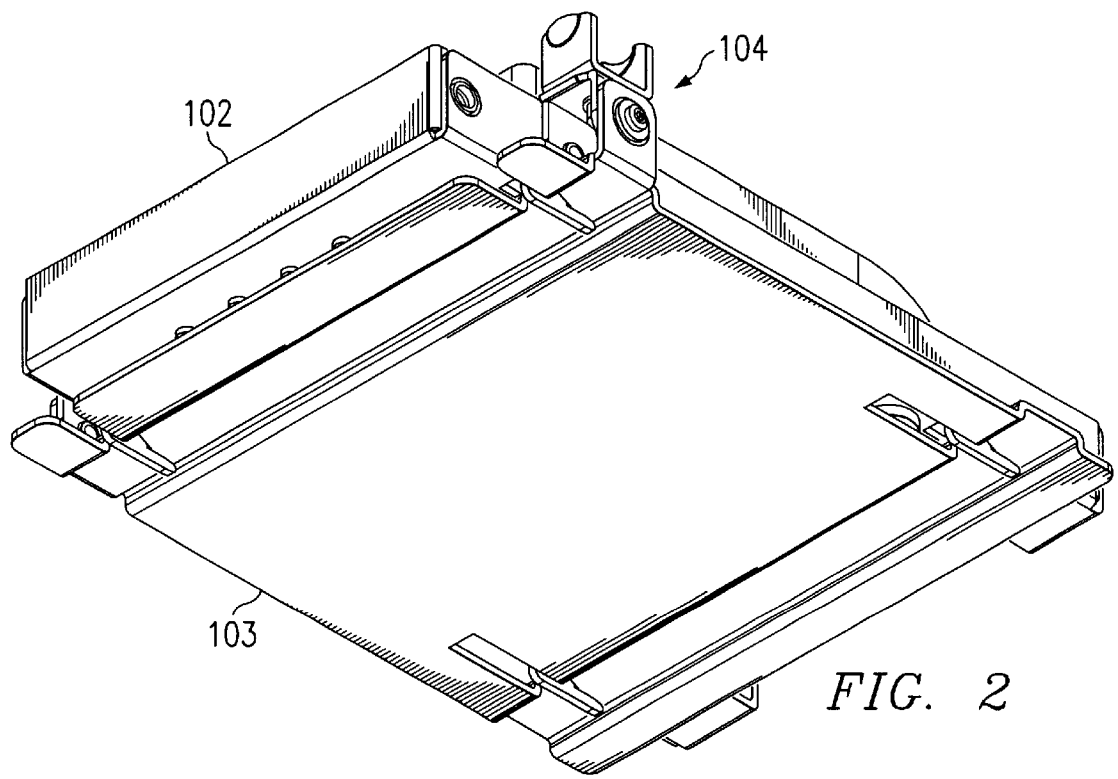
FIG. 2 shows the fastening device of FIG. 1 from a second perspective.

FIGS. 1 and 2 show one embodiment of the present invention where rotatable bracket assembly 104 is used to attach computer hard drive 101 to a support member such as floor piece 103. Floor piece 103 may be a rigid attachment. Note that the present invention may be used to attach any two structures to each other. In the embodiment that is shown in FIG. 1, computer hard drive 101 is connected to device bracket 102 that, in turn, is attached to floor piece 103 by rotating bracket assembly 104. Rotating bracket assembly 104 directionally rotates as indicated by reference arrow 107. Rotating bracket assembly 104 is positionable to provide ready access to a fastener, such as a mounting screw connecting opposing halves of the bracket. Additionally, other methods of assisting alignment may be used such as locking tab 106 that engages receiving slot 105.

Figure 3:
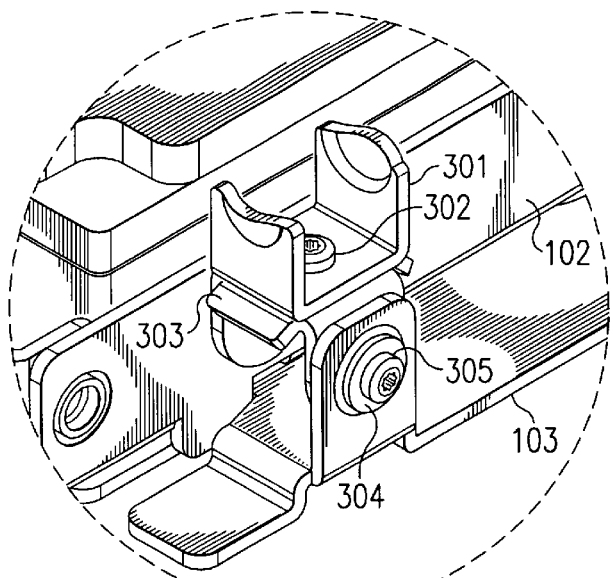
FIG. 3 shows an enlarged diagram of one embodiment of the present invention.

FIG. 3 shows an enlarged view of one embodiment of the present invention. In this figure, the entire rotating bracket assembly is shown with the head of mounting screw 302 pointing up to provide access from above for removing the screw, enabling rotating mount bracket 301 to separate from rotating mount bracket 303. With portions of rotating mount brackets 301 and 303 separated by a space (in this case, on both sides of device bracket 102), device bracket 102 may be moved forward to disengage device bracket 102 from floor piece 103 and allow its removal by lifting upward.

Figure 4:
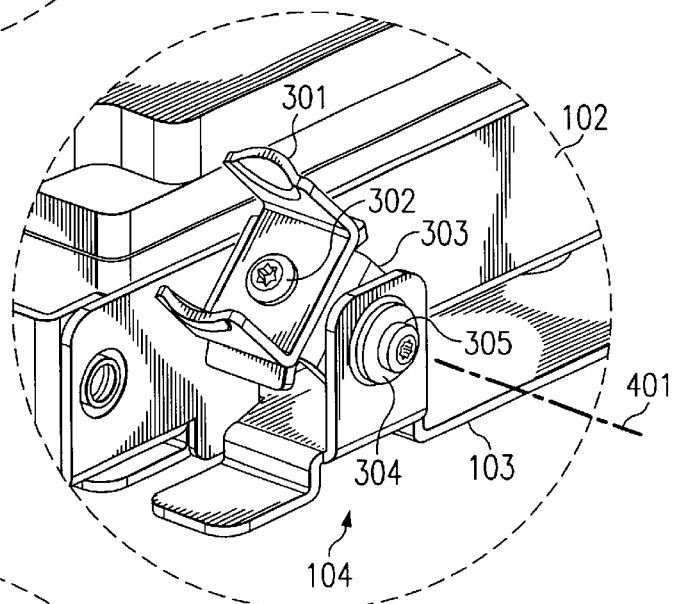
FIG. 4 shows the enlarged diagram of FIG. 3 after the fastening device has been rotated approximately 45 degrees.

Alternatively, FIG. 4 shows the rotating bracket assembly with the head of mounting screw 302 positioned at a 45° angle from its vertical position in FIG. 3. The positioning capability of rotational mount assembly 104 comprises access to mounting screw 302 from various angles. As shown, rotational mount assembly 104 comprises a first rotating mount bracket 301, a second rotating mount bracket 303, and mounting screw 302 that attaches first rotating mount bracket 301 to second rotating mount bracket 303. First rotating mount bracket 301 would, in this configuration, be attached to the device that is being mounted, for example, disk bracket 102. Second rotating mount bracket 303 would be attached to, in this example, the chassis, such as floor piece 103. In this case, rotating mount bracket 303 is attached to floor piece 103 by assembly screw 305. Washer 304 is positioned between assembly screw 305 and rotating mount bracket 303. Additional washers and fastening means may be employed to provide for rotation of rotating mounting brackets 301 and 303 about a common longitudinal axis (401 of FIG. 4) defined by the longitudinal axis of assembly screw 305. While rotating mounting brackets 301 and 303 should be positionable to provide for access to mounting screw 302 from multiple positions, some resistance or locking mechanism may be employed to maintain the assembly in a desired position while mounting screw 302 is manipulated. For example, a series of clicking stops using a detent system may be incorporated to hold mounting screw 302 in a desired position. To this end, rotating mount bracket 301 is shown with a pair of parallel ear pieces to provide for its grasping and manual positioning.

In a preferred embodiment, the attachment between rotating mount bracket 303 and the item it is attached to uses assembly screw 305 and threaded inserts (601 of FIG. 6) that are pressed into rotating mounting bracket 303 to allow for its rotation. Similarly, an assembly screw 501, washer 502 and threaded insert 602 (FIG. 6) are used to connect rotating mounting bracket 301 to disk bracket 102.

Threaded inserts 601 and 602 are configured to be pressed into material such as a sheet metal piece. Note that threaded insert 601 and 602 or similar inserts may also be pressed into plastic, fiberglass or similar material now known or later developed. Threaded inserts 601 and 602 have internal threads at a given thread type while the outside portion of the threaded inserts have a round cylinder portion and a mounting feature on the bottom that, using a hydraulic press, is pressed into the sheet metal. Threaded inserts 601 and 602 extend out from rotating mounting brackets 301 and 303 such that they extend into and through a clearance hole in device bracket 102 and floor piece 103, respectively, and provide a bearing mechanism. Effectively, the threaded inserts enable rotating bracket assembly 104 to rotate back and forth without loosening assembly screws 305 and 501. One manufacturer of a suitable threaded insert is Penn Engineering & Manufacturing.

Assembly screw 305 attaches rotating mounting bracket 303 to floor piece 103 and assembly screw 501 attaches mounting bracket 301 to device bracket 102. While threaded assemblies 601 and 602 extend through the hole in the sheet metal, they preferably do not fasten the brackets to the assemblies. Assembly screws 305 and 501 preferably ensure connections between rotating mounting brackets and the assemblies.

Note that although FIG. 4 illustrates rotational mount assembly 104 rotating to 45°, any appropriate angular rotation up to the physical limits provided may be accommodated, e.g., rotation of rotating mount bracket 104 does not have to stop at 45° but may rotate to 90° or more, in either direction.

Figure 5:
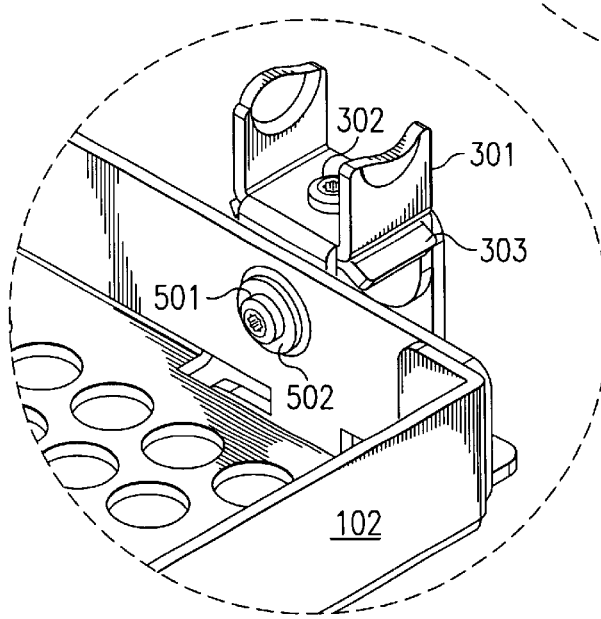
FIG. 5 shows another view of the fastening device of FIG. 1.
Figure 6:
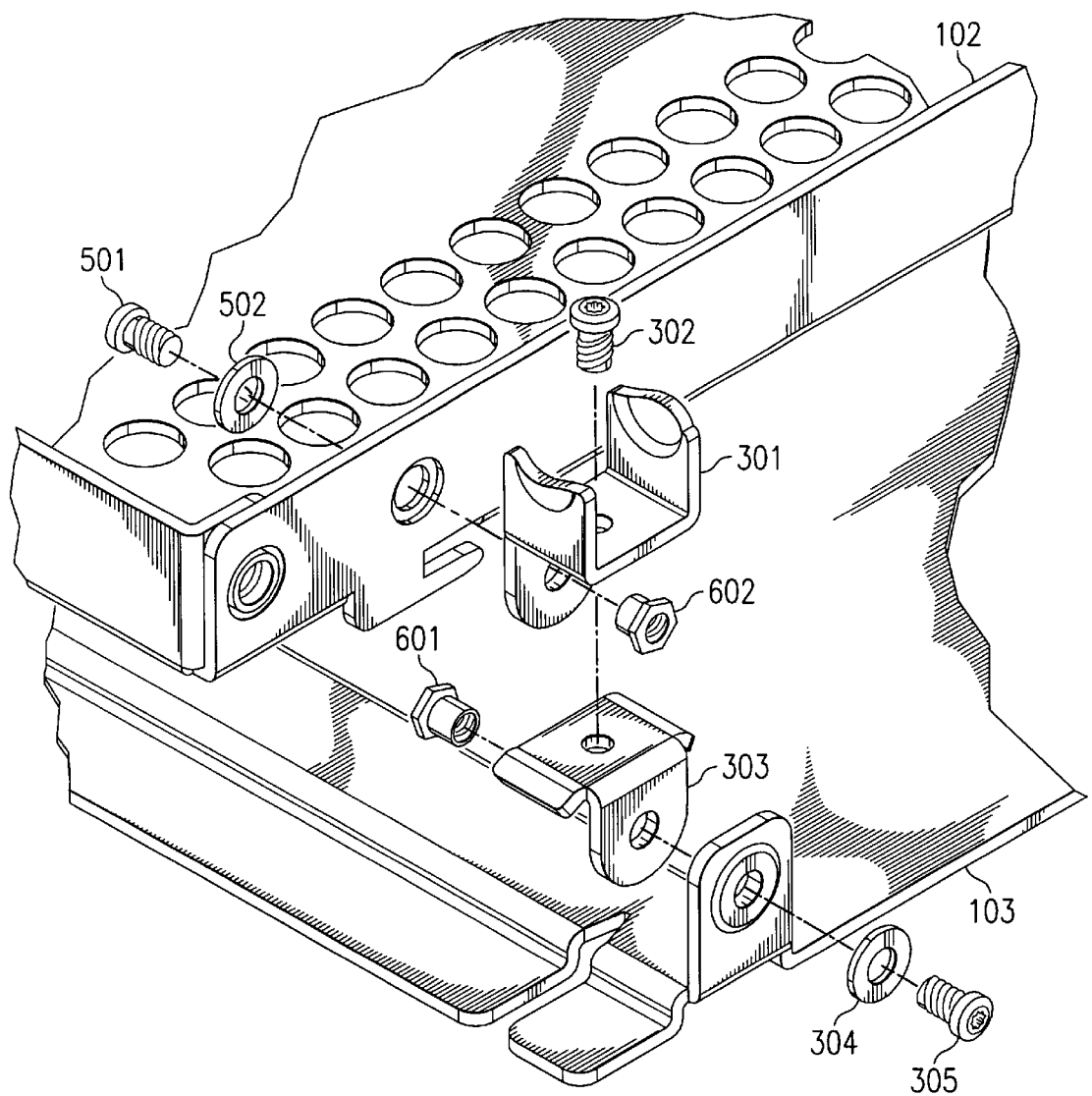
FIG. 6 shows an exploded view of one embodiment of the fastening device of FIG. 1.

FIG. 5 shows another perspective of a fastener of the present invention. Assembly screw 501 is used to hold rotating mount bracket 301 to device bracket 102 and permits rotating mount bracket 104 to rotate with respect to device bracket 102. Assembly screw 501 screws into threaded insert 602 (FIG. 6). Preferably, assembly screw 501 is longitudinally aligned with assembly screw 305 to provide for the pivoting of rotating mount brackets 301 and 303 about a common axis (401 of FIG. 4).

Note that assembly screw 501 and assembly screw 305 are not necessarily different types of screws and the same type of screw may be used in each position. Similarly, while different reference numbers are used for threaded inserts 601 and 602, these parts may also be identical.

FIG. 6 is an exploded view of one embodiment of the present invention. Rotating bracket assembly 104 (FIG. 1) comprises rotating mount bracket 301 rotatably attached to disk bracket 102 via washer 502, assembly screw 501 and threaded insert 602. Similarly, rotating mount bracket 303 may be rotatably attached to floor piece 103 via washer 304, assembly screw 305 and threaded insert 601. Note that washer 304 or washer 502 are not necessary to practice the present invention but may be helpful in enhancing bracket rotation capabilities. Rotating mount brackets 301 and 303 are mounted to device bracket 102 and floor piece 103, respectively, and are attached to each other via mounting screw 302. Mounting screw 302 goes through a hole located in a perpendicular arm portion of rotating mount bracket 301. The perpendicular arm (also known as an "L" bracket) may be a fastening structure for rotatably securing brackets 301, 303 to structures (e.g., each other, bracket 102 or floor piece 103). After passing through the hole in rotating mount bracket 301, mounting screw 302 threads into a threaded hole located in a perpendicular arm potion of the rotating mount bracket 303 attached to floor piece 102. Accordingly, mounting brackets 301 and 303 are connected in two positions along a rotating axis and a portion of bracket 301 is separated by a space from a portion of bracket 303. Alternatively, other means of fastening mount brackets 301 and 303 are also encompassed in the present invention, and include, but are not limited to a bolt, washer and nut.

Assembly screws 305 and 501 are each screwed into threaded insert 601 and 602 respectively. The portion of threaded inserts 601 and 602 that contacts the brackets is a round cylindrical portion that extends out of the sheet metal and into a corresponding hole in device bracket 102 and in floor piece 103. The interface between threaded inserts 601 and 602 bearing against the respective hole in the brackets allow the entire assembly to rotate.

The hole in rotating mount bracket 303 that receives mounting screw 302 may be an extruded and tapped hole. The hole may be formed by punching a hole in the sheet metal, or other material, pressing and deforming a portion of the material down. A tap is then used to create the corresponding threads that engage mounting screw 302.

While the present invention has been illustrated in terms providing access to mounting hardware securing an equipment tray or shelf to a bracket or other support, the invention is equally applicable to other uses and environments wherein it is desirable to provide ready access to attachment hardware. For example, the paired rotating mounting brackets may be used to secure any type of device to a mount or other device. The rotating mounting bracket may be used with electronic devices, mechanical apparatus, etc. Further, although the invention has been illustrated in connection with lightweight components in a relatively benign environment, it is equally applicable to large, heavy components in a harsh environment (e.g., automotive, space equipment, construction equipment, etc.). The present invention may also be used in mounting equipment to racks, office equipment in cabinets or other similar applications. Still further, use of a rotating mounting bracket to attach equipment and supports may be employed, as may other devices to fasten the brackets together (e.g., thumb screws, wingnuts, etc.)

What is claimed is:

1. A fastening system comprising:
   a first mount bracket rotatably attached to a first assembly;
   a second mount bracket rotatably attached to a second assembly; and
   a rigid attachment between said first mount bracket and said second mount bracket wherein said attachment enables said first mount bracket and said second mount bracket to rotate together about a common axis and wherein said attachment enables a portion of said first mount bracket and a portion of said second mount bracket to be separated by space;
   wherein said first and second mount brackets each comprise first and second perpendicular arm portions, said first arm portions having fastening structures for rotatably securing said first and second mount brackets to respective structures and said second arm portions comprising said rigid attachment.

2. The fastening system of claim 1 wherein said first mount bracket is attached to said first assembly with an assembly screw and an insert.

3. The fastening system of claim 2 wherein said insert is a threaded insert and said assembly screw screws into said threaded insert.

4. The fastening system of claim 1 wherein said rigid attachment between said first and second mount brackets comprises a machine screw.

5. The fastening system of claim 1 wherein said first mount bracket further comprises at least one ear for manual grasping and positioning of said fastening system.

* * * * *